United States Patent [19]
Shanley

[11] Patent Number: 5,093,927
[45] Date of Patent: Mar. 3, 1992

[54] TWO-WAY COMMUNICATION SYSTEM

[75] Inventor: Charles W. Shanley, Plantation, Fla.

[73] Assignee: Motorola, Inc., Schaumburg, Fla.

[21] Appl. No.: 636,021

[22] Filed: Jan. 4, 1991

Related U.S. Application Data

[63] Continuation of Ser. No. 424,425, Oct. 20, 1989, abandoned.

[51] Int. Cl.⁵ .................... H04B 15/00; H04Q 7/00
[52] U.S. Cl. ......................................... 455/34; 455/62; 455/63; 379/63
[58] Field of Search ............... 455/9, 10, 13, 15, 54, 455/33, 34, 50, 63, 67, 166, 62; 379/58–65; 340/825.5

[56] References Cited

U.S. PATENT DOCUMENTS

| | | | |
|---|---|---|---|
| 4,553,262 | 11/1985 | Coe | 455/54 |
| 4,672,657 | 6/1987 | Dershowitz . | |
| 4,723,264 | 2/1988 | Sasuta et al. . | |
| 4,744,101 | 5/1988 | Saegusa . | |
| 4,747,101 | 5/1988 | Akaiwa et al. | 455/33 |
| 4,768,220 | 8/1988 | Yoshihara et al. . | |
| 4,780,885 | 10/1988 | Paul et al. | 455/67 |
| 4,783,780 | 11/1988 | Alexis | 455/33 |
| 4,794,635 | 12/1988 | Hess | 455/33 |
| 4,797,948 | 1/1989 | Millcorn et al. | 455/67 |
| 4,881,271 | 11/1989 | Yamauchi et al. | 455/33 |
| 4,882,766 | 11/1989 | Akaiwa | 455/67 |

FOREIGN PATENT DOCUMENTS

| | | | |
|---|---|---|---|
| 8502745 | 6/1985 | World Int. Prop. O. | 455/33 |
| 8705181 | 8/1987 | World Int. Prop. O. | 455/33 |

OTHER PUBLICATIONS

"Trunked Radio Systems Spur Interconnect Technology" by Don Bishop, Mobile Radio Technology, Sep. 1988, pp. 26–30.

"Integrating Voice And Data on a Mobile Radio System" by Harold P. Stern, Mobile Radio Technology, Sep. 1988, pp. 56–64.

Primary Examiner—Reinhard J. Eisenzopf
Assistant Examiner—Lisa Charouel
Attorney, Agent, or Firm—Pablo Meles

[57] ABSTRACT

A communication system (10) has at least one communication resource controller (28) for allocating a limited number of communication resources among a plurality of communication units. The communication resource controller monitors the communication resources and maintains a data library of the level and duration of any interference of the communication resources. The communication units (20 and 22) are constructed and arranged to communicate information on any of the communication resources. Any one of the plurality of communication units can initiate access to a communication resource by transmitting a request therefor. In response to a proper request, the communication resource controller (28) assigns a communication resource the communication units in accordance with the data retrieved from the interference data library.

12 Claims, 2 Drawing Sheets

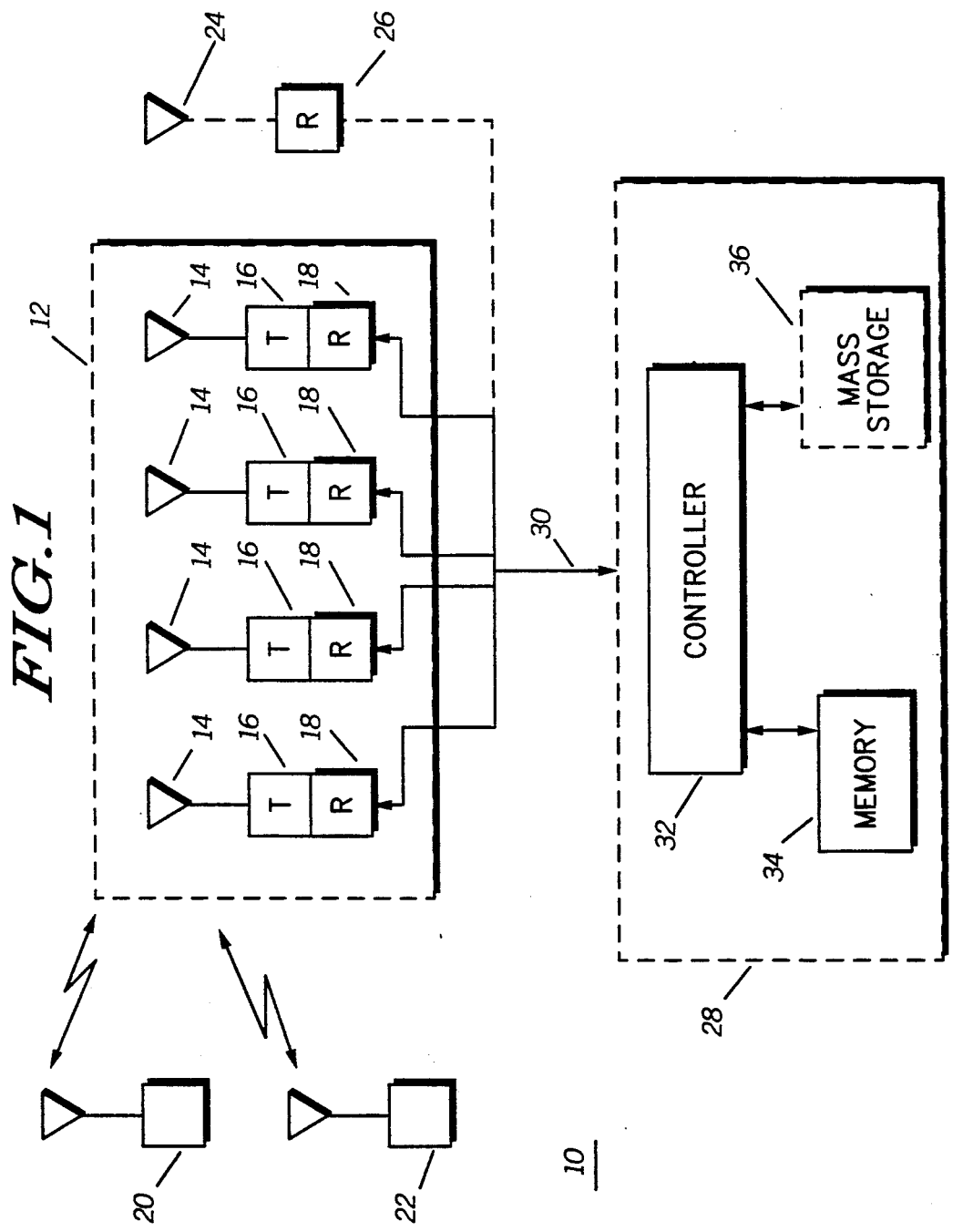

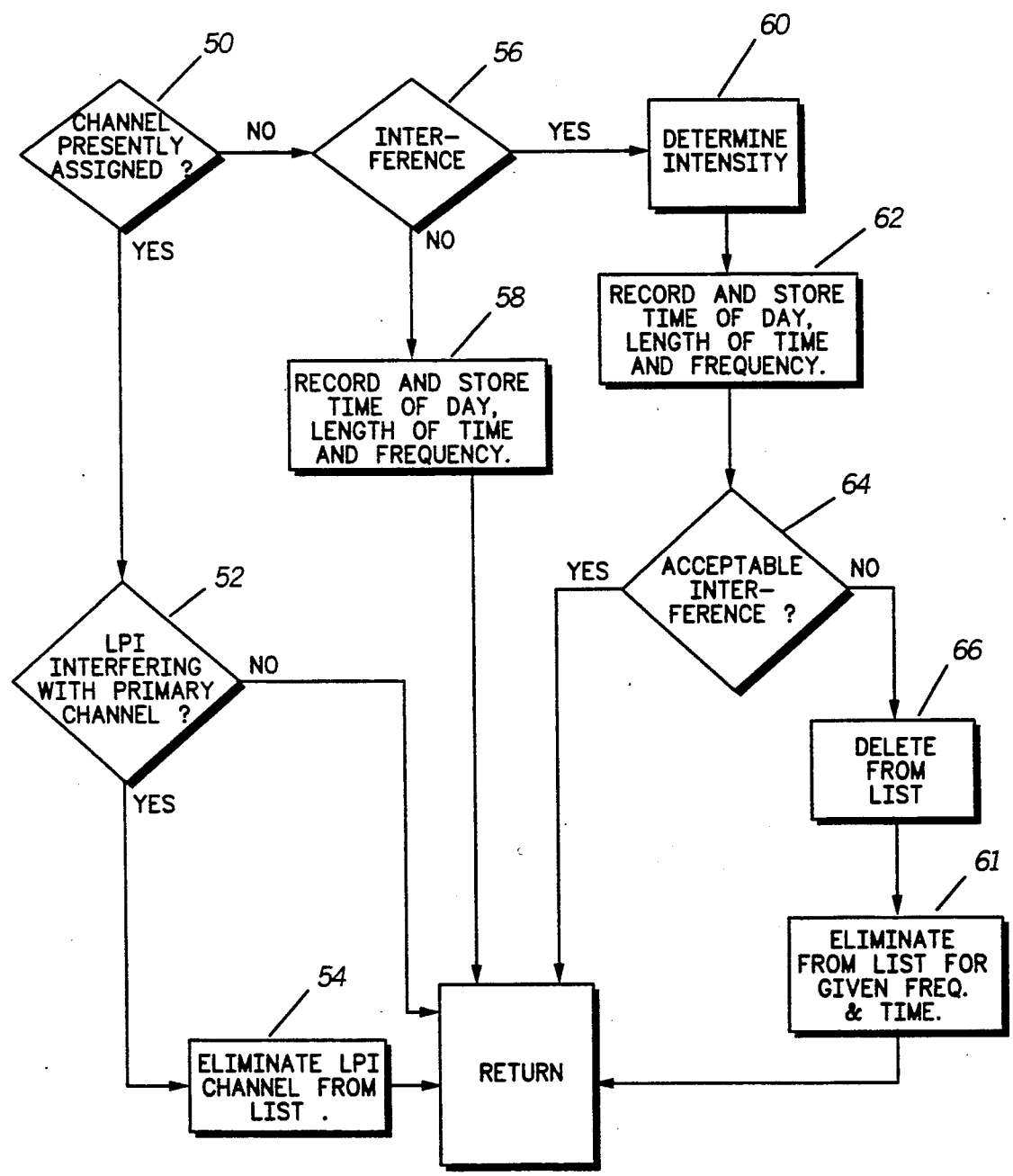

TWO-WAY COMMUNICATION SYSTEM

This is a continuation of application Ser. No. 07/424,425, filed 10/20/89 and now abandoned.

TECHNICAL FIELD

This invention relates generally to radio communication systems, and more specifically to low power radio communication systems suitable for use within a building or over a limited geographic area, and is more particularly directed toward a low power trunked communication system for use within a building or other limited geographic site.

BACKGROUND

Trunked communication systems today afford an efficient use of the limited frequency spectrum. Organizations, both private and public, have utilized and tailored trunked systems for their individual communication needs.

In known trunked communication system, a central controller allocates a limited number of communication channels among many radios. Generally, within the trunked system, the many users of the radios are organized into talk-groups as well as individual units. Accordingly, each radio has an individual identification (ID) code and one or more group IDs. Since the number of communications channels is far less than the number of radios, the radios must request and be granted a channel before they may communicate. To do this, the central controller monitors a control channel for channel request from the several radios. Upon receipt of a request, the controller assigns an available channel (if any) to handle the conversation.

Within a particular area, the Federal Communications Commission (F.C.C.) grants a limited number of licenses for high power radio transmission. Such users are commonly referred to as "primary user", that communicate over "primary channels". In policing the use of these primary channels, the F.C.C. enforces stringent administrative requirements, including the transmit frequency, the transmitted power level, spectral purity of the transmitted signal, as well as a myriad of administrative requirements.

In addition to high power radio licensing, over 200 frequencies are allocated by the F.C.C. as low power industrial (LPI) frequencies. These frequencies reside in the 450 megahertz (MHz) to 470 MHz band, and thus, occupy the same band as conventional land mobile frequencies and the UHF business band. To qualify as an LPI radio, transmitter power is limited to two (2) watts. Comparatively, primary channel radios typically have a transmitter power of 50 Watts, although some portable primary radios may have transmitter powers as low as 1 Watt.

Each LPI channel has a 25 KHz bandwidth allocation, but are offset from the primary (high power) channels so as to minimize interference. In this regard, LPI users are regarded as secondary users. That is, an LPI system can use a selected frequency within the LPI band so long as primary users are not interfered with. If a transmitted LPI signal interferes with a primary channel, the LPI user must abandon the channel. Conversely, if a primary user interferes with an LPI channel, the LPI user can remain on the channel if they are willing to tolerate the primary user's interference. Otherwise, the LPI user can abandon the channel in favor of another LPI channel.

To partially compensate for these inconveniences, the FCC has relaxed the requirements for obtaining LPI licenses. Current FCC rules allow an LPI channel user to license several channels simultaneously without the stringent administrative requirements imposed upon high power radios. In fact, licenses for more LPI channels than a contemporary communication system can accommodate are relatively easy to obtain. Thus, a need exists for an LPI communication system that can manage and control several LPI communication channels within the rules and regulations established by the regulatory authorities.

BRIEF DESCRIPTION OF THE DRAWINGS

FIG. 1 is a block diagram of a communication system in accordance with the present invention.

FIG. 2 is a flow diagram illustrating the steps executed by the controller of FIG. 1.

DETAILED DESCRIPTION OF THE PREFERRED EMBODIMENT

Referring to FIG. 1, there is shown a two-way communication system 10 in accordance with the present invention. In the preferred embodiment, a trunked communication system comprises a plurality of repeaters 12, each comprising an antenna 14, a transmitter portion 16 and a receiver portion 18 so as to be capable of communicating radio frequency information with a plurality of communication units (two shown). To initiate communication, a requesting subscriber unit 20 transmits a request to communicate with one or more other communication units (22 in this example). This request is received by one or more of the repeaters operating as a control channel to communicate information with a resource controller 28. According to the invention, the communication system 10 may operate by reserving one of the plurality of repeaters 12 as a dedicated control channel repeater, or operate with more than one repeater communicating control channel information, or may operate using a transparent or distributed control channel using communication protocols known in the art.

The resource controller 28 is coupled to each of the repeaters via a network 30 so as to be able to control and monitor the communication activities throughout the communication system 10. If a communication resource is available, the resource controller 28 assigns a communication resource (for example, a radio frequency channel or time slot) to the requesting communication unit and the call communication unit 22.

To make the assignment or allocation of the communication resource(s), the resource controller 28 peruses its memory 34 to determine which communication resource(s) are available for assignment. According to the invention, this determination is made by examining the past history of a plurality of LPI channels to determine which has the least amount of interference. This interference may be caused by a primary user's transmission, other LPI user's transmission, or may be merely atmospheric or other types of interference degrade intelligibility and impede effective communications. According to the invention, the communication system 10 takes advantage of the ease of licensing LPI channels. That is, the plurality of repeaters 12 providing the communication hardware for the communication resources represents only a subset of the total licensed channels available to the two-way communication system. For example, a communication system having twenty repeaters may license fifty LPI channels. Of course, only twenty of the available fifty may be used at any one time, however, the present invention operates to insure that the best twenty are in use, and that degraded channels or channels interfering with primary users are not used. In this way, the communication resource controller 28 operates to assign the best possible communication resource to a requesting communication unit so as to facilitate effective communications throughout the system.

The resource controller 28 comprises essentially, a controller 32 and memory 34. In one embodiment, the controller 32 comprises an MC68HC11 microcontroller manufactured by Motorola, Inc., or its functional equivalent. The controller 32 communicates over the network 30 with one or more of the repeaters to establish and maintain a historical data library of interference data collected from the several LPI channels licensed for use on the communication system. To do this, the receiver portion 18 of a currently unused repeater (if any) is instructed to monitor an un-used but available (i.e., unassigned) communication resource or an unavailable communication resource (i.e., one of the licensed channels not currently having a repeater assigned thereto) so that the data base stored in the memory 34 may be updated and maintained. If each repeater at a particular instance happens to be busy communicating information within the communication system, no further historical interference data could be collected during those intervals. However, with the full capacity of the system being then utilized, no further request for channels could be processed.

Optionally, a separate receiver 26 may be installed to receive information via an antenna 24 so as to be able to continually monitor the several LPI channels licensed to the system. In this way, interference data collection and historical data library maintenance can be performed continuously without regard to the capacity (i.e., the number of operational repeaters) of the communication system. According to the invention, the historical data resides in a memory 34 so that the controller 32 may examine this data prior to making an assignment of a communication resource. This memory may be of any suitable type as required or desired in any particular implementation. Suitable known memory devices comprise RAM, DRAM, and EEPROM or their functional equivalents. Depending upon the type and quantity of this data, it may be optionally desired to provide some mass storage 36 (such as magnetic tape or equivalent), so that a suitable amount of information can be stored. According to the invention, the operating frequency of the communication channel, the time of day the interference is detected, and the level of the interference are parameters that are considered of primary importance in determining the amount of corruption present on any given channel. In this way, the present invention can operate to assign the available plurality of repeaters to those channels that are substantially interference free or have a small amount of interference while remaining available to effectively communicate information throughout the system.

Referring to FIG. 2, a flow diagram illustrating the steps executed by the resource controller 28 of the present invention is illustrated. The routine begins in decision 50, which determines whether the low power channel about to be scanned is presently assigned. If the channel is assigned, decision 52 determines whether the low power user is interfering with primary user during the communication. If the determination of decision 52 is that the low power user is not interfering with the primary user, the routine returns to other known tasks useful in communication system control. Conversely, should the LPI user interfere with a primary channel, the routine proceeds to step 54, where that channel is permanently eliminated from the list of available LPI frequencies for the communication system. In this way, the present invention operates to provide the best available channel to the LPI users while operating within the rules and regulations provided by the communication regulatory authorities for the communication system. Generally, this action will not reduce communication throughput or substantially degrade communication effectiveness since the present communication system licenses several more LPI channels than it has communication hardware (i.e., repeaters).

Assuming that the determination of decision 50 is that the channel is presently unassigned, the routine proceeds to decision 56, which determines whether any interference is detected on the channel. That is, if the communication resource controller 28 has determined that the communication channel is unassigned, there should be no traffic activity (voice or data) present on that channel. Therefore, the detection of any such communication traffic is one measure of interference that can be recorded for that channel. Thus, if there is no interference measured on the channel being scanned (either by a receiver portion 18 of a repeater or by the optional receiver 26) suitable information is recorded and stored (step 58) in the memory 34 (or optionally the mass storage 36). In the preferred embodiment, the time of day, the length of the scanning interval, and the channel number are all considered of primary importance in determining the whether (and how long) that the channel is interference free. In this way, when the historical data library is examined, the communication resource controller may achieve a greater confidence that a channel is interference free in those circumstances where the channel has been substantially interference free for a long period of time or over several days or weeks.

Assuming that the determination of decision 56 is that interference activity was detected, the routine proceeds to step 60, where the magnitude or intensity of the interference is determined. According to the preferred embodiment, this may be accomplished by measuring power received by the receiver 26 or the receiver section 18 of a repeater. Following this, step 62 records the time of day, length of the scanning interval, channel frequency, and other suitable parameters so as to maintain an adequate data library of the interference. In decision 64, the interference is examined and compared to one or more thresholds of acceptable levels so as to properly categorize the channel in the memory 32. That is, one or more levels or grades of channels are available in the present invention and may be assigned in descending order of intelligibility so as to assign the best available communication resource at all times. If the measured interference level is acceptable, decision 64 will return to other activities after properly marking that LPI channel for later use. Conversely, a negative determination of decision 64 causes that channel to be deleted from the list in step 66 as containing unacceptable interference. Optionally, the channel could be temporarily eliminated from the available channel list during those time intervals or days where the interference level is high and may be optionally reassigned during periods of historical low interference or acceptable interference. In this way, channels that suffer temporary, but repeated interference can be used to some extent by the present communication system.

In summary, the present invention operates to assign the best available subset of a plurality of channels as communication resources to a plurality of subscribers operating on a communication system. Interfering channels or channels that have unacceptable interference levels are eliminated from system use, while partially interfered channels are categorized and assigned in such a manner so as to maximize intelligibility and effective communication throughput.

What is claimed is:

1. In a communication system having a communications resource controller for allocating a limited number of communication resources among a plurality of communication units constructed and arranged to communicate information on any of the communications resources, a method for one of the plurality of communication units to initiate access to a communications resource, comprising the steps of:
   at the communications resource controller:
   (a) constantly monitoring at least one of the communication resources for interference or interference with a primary channel;
   (b) constantly maintaining information as to which communication resources are substantially free from said interference with interference or free from a primary channel;
   (c) categorizing said communication resources based on the level of interference monitored;
   (d) permanently eliminating the availability of communication resources having said interference with a primary channel;
   (e) receiving a request for and assigning a communication resource to at least one communication unit based on said categorizing;
   at the communication unit:
   (a) requesting access to a communications resource;
   (b) receiving a signal identifying a communication resource;
   (c) initiating communications on the communications resource identified by the communications resource controller.

2. The method of claim 1, wherein the assigning of a communication resource is based on current data received from a scanning receiver monitoring allocated frequencies.

3. The method of claim 1, wherein the assigning of a communication resource is determined on the number of recorded instances of interference stored in a database in memory.

4. The method of claim 1, wherein the assigning of a channel is based on current data retrieved by a receiver and based on historical data stored in a memory means within the communications resource controller.

5. A low power industrial communications system for allocating a limited number of communication resources among a plurality of communication units, comprising:
   a plurality of variable frequency trunking repeaters, any of said plurality of repeaters being a receiver for constantly monitoring interference and interference with primary users on said communication resources;
   a control channel constantly monitored for requests for communication resources by said communication units; and
   a communication resource controller linked to said repeaters and said control channel having processing means for categorizing and assigning a communication resource to said requesting communication units via any one of said plurality of repeaters based on the history of interference, usage by primary users, and availability found on said communication resource, said communication resource controller further including a means for permanently eliminating the availability of communication resources being used which interfere with said primary users.

6. The communications system of claim 5, wherein the processing means comprises a microprocessor.

7. The communications system of claim 5, wherein the processing means comprises a an analog-to-digital converter.

8. The communications system of claim 5, wherein the processing means comprises a microprocessor with memory.

9. A communication system having a communication resource controller for allocating a limited number of communication resources among a plurality of communication units, the communication units constructed and arranged to initiate access to the communication resources and to communicate information on any of the communication resources, comprising:
   in the communications resource controller:
   (a) means for constantly monitoring at least one of the communication resources for interference or interference with a primary channel user;
   (b) means for constantly maintaining information as to which communication resources are substantially free from said interference with interference and free from a primary channel user;
   (c) means for categorizing said communication resources based on the level of interference monitored;
   (d) means for permanently eliminating the availability of communication resources having said interference with a primary channel;
   (e) means for user receiving a request and assigning a communication resource to at least one communication unit;
   in the communication unit:
   (a) means for requesting access to a communications resource;
   (b) means for receiving a signal identifying a communication resource;
   (c) means for initiating communications on the communications resource, identified by the communications resource controller.

10. The communication system of claim 9, wherein the means for assigning a communication resource uses current data received from a receiver.

11. The communication system of claim 9, wherein the means for assigning a communication resource utilizes a database with recorded instances of interference stored in a memory means within the communication resource controller.

12. The communication system of claim 9, wherein the means for assigning a channel uses current data retrieved by a receiver and historical data stored in a memory means within the communication resource controller.

* * * * *